mmary Provided).

(12) United States Patent
Chavel et al.

(10) Patent No.: US 8,331,007 B2
(45) Date of Patent: Dec. 11, 2012

(54) OPTICALLY TRANSPARENT COMPONENT WITH TWO SETS OF CELLS

(75) Inventors: Pierre Chavel, Orsay (FR); Jerome Ballet, Charenton le Pont (FR); Christian Bovet, Charenton le Pont (FR); Jean-Paul Cano, Charenton le Pont (FR); Paul Lefillastre, Charenton le Pont (FR)

(73) Assignees: Essilor International (compagnie Generale d'optique), Charenton le Pont (FR); Centre National de la Recherche Scientifique-CNRS, Paris (FR)

( * ) Notice: Subject to any disclaimer, the term of this patent is extended or adjusted under 35 U.S.C. 154(b) by 238 days.

(21) Appl. No.: 12/521,312

(22) PCT Filed: Dec. 20, 2007

(86) PCT No.: PCT/EP2007/064336
§ 371 (c)(1),
(2), (4) Date: Oct. 20, 2010

(87) PCT Pub. No.: WO2008/077880
PCT Pub. Date: Jul. 3, 2008

(65) Prior Publication Data
US 2011/0043925 A1 Feb. 24, 2011

(30) Foreign Application Priority Data
Dec. 26, 2006 (FR) ...................... 06 11377

(51) Int. Cl.
*G02F 1/07* (2006.01)
*G02F 1/153* (2006.01)
*G02B 26/00* (2006.01)

(52) U.S. Cl. ............ 359/245; 359/273; 359/296
(58) Field of Classification Search ................ 359/245, 359/273, 296
See application file for complete search history.

(56) References Cited

U.S. PATENT DOCUMENTS

| 2,196,066 A | 4/1940 | Feinbloom |
| 2,511,329 A | 6/1950 | Craig |
| 3,460,960 A | 8/1969 | Francel et al. |
| 3,532,038 A | 10/1970 | Rottmann et al. |
| 3,628,854 A | 12/1971 | Jampolsky |
| 3,978,580 A | 9/1976 | Leupp et al. |

(Continued)

FOREIGN PATENT DOCUMENTS
AU 779628 2/2005
(Continued)

OTHER PUBLICATIONS

Cognard, Philippe. "Colles et adhesifs pour emballages, Generalities," 18 pages (English Summary Provided).

(Continued)

*Primary Examiner* — William Choi
(74) *Attorney, Agent, or Firm* — Occhiuti Rohlicek & Tsao LLP

(57) ABSTRACT

A transparent optical component comprises two sets of cells (1) disposed in respective superposed layers (10, 20). Each cell (1) contains an optically active material, and the cells in each set are isolated from one another by separating portions (2) within the corresponding layer. The cells (1) of one layer are offset relative to the cells of the other layer so as to be located in line with the separating portions (2) pertaining to the other layer. Such optical component exhibits transparency that is improved compared with components having a single layer of cells or cells that are superposed.

35 Claims, 3 Drawing Sheets

U.S. PATENT DOCUMENTS

| | | | |
|---|---|---|---|
| 4,150,878 A | 4/1979 | Barzilai et al. |
| 4,268,132 A | 5/1981 | Neefe |
| 4,601,545 A | 7/1986 | Kern |
| 4,621,912 A | 11/1986 | Meyer |
| 4,720,173 A | 1/1988 | Okada et al. |
| 4,791,417 A | 12/1988 | Bobak |
| 4,994,664 A | 2/1991 | Veldkamp |
| 5,017,000 A | 5/1991 | Cohen |
| 5,044,742 A | 9/1991 | Cohen |
| 5,067,795 A | 11/1991 | Senatore |
| 5,139,707 A | 8/1992 | Guglielmetti et al. |
| 5,233,038 A | 8/1993 | Guglielmetti et al. |
| 5,359,444 A | 10/1994 | Piosenka et al. |
| 5,529,725 A | 6/1996 | Guglielmetti et al. |
| 5,576,870 A | 11/1996 | Ohmae et al. |
| 5,585,968 A | 12/1996 | Guhman |
| 5,604,280 A | 2/1997 | Pozzo et al. |
| 5,699,142 A | 12/1997 | Lee et al. |
| 5,733,077 A | 3/1998 | MacIntosh |
| 5,763,054 A | 6/1998 | Samec et al. |
| 5,764,333 A | 6/1998 | Somsel |
| 5,774,273 A | 6/1998 | Bornhorst |
| 5,805,263 A | 9/1998 | Reymondet et al. |
| 5,807,906 A | 9/1998 | Bonvallot et al. |
| 5,812,235 A | 9/1998 | Seidner et al. |
| 5,905,561 A | 5/1999 | Lee et al. |
| 5,914,802 A | 6/1999 | Stappaerts et al. |
| 6,019,914 A | 2/2000 | Lokshin et al. |
| 6,118,510 A | 9/2000 | Bradshaw et al. |
| 6,199,986 B1 | 3/2001 | Williams et al. |
| 6,259,501 B1 | 7/2001 | Yaniv |
| 6,274,288 B1 | 8/2001 | Kewitsch et al. |
| 6,281,366 B1 | 8/2001 | Frigoli et al. |
| 6,301,051 B1 | 10/2001 | Sankur |
| 6,307,243 B1 | 10/2001 | Rhodes |
| 6,309,803 B1 | 10/2001 | Coudray et al. |
| 6,327,072 B1 | 12/2001 | Comiskey et al. |
| 6,449,099 B2 | 9/2002 | Fujimoto et al. |
| 6,485,599 B1 | 11/2002 | Glowina et al. |
| 6,577,434 B2 | 6/2003 | Hamada |
| 6,597,340 B1 | 7/2003 | Kawai |
| 6,707,516 B1 | 3/2004 | Johnson et al. |
| 6,712,466 B2 | 3/2004 | Dreher |
| 6,871,951 B2 | 3/2005 | Blum et al. |
| 6,934,088 B2 | 8/2005 | Lai et al. |
| 6,963,435 B2 | 11/2005 | Mallya et al. |
| 6,987,605 B2 | 1/2006 | Liang et al. |
| 7,036,929 B1 | 5/2006 | Harvey |
| 7,144,529 B1 | 12/2006 | Mercier |
| 7,227,692 B2 | 6/2007 | Li et al. |
| 7,289,260 B2 | 10/2007 | Kaufman et al. |
| 7,404,637 B2 | 7/2008 | Miller et al. |
| 7,533,453 B2 | 5/2009 | Yancy |
| 7,715,107 B2 | 5/2010 | Loopstra et al. |
| 2002/0008898 A1 | 1/2002 | Katase |
| 2002/0016629 A1 | 2/2002 | Sandstedt et al. |
| 2002/0080464 A1 | 6/2002 | Bruns |
| 2002/0114054 A1 | 8/2002 | Rietjens |
| 2002/0140899 A1 | 10/2002 | Blum et al. |
| 2002/0145797 A1 | 10/2002 | Sales et al. |
| 2002/0167638 A1 | 11/2002 | Byun et al. |
| 2002/0176963 A1 | 11/2002 | Chen et al. |
| 2003/0003295 A1 | 1/2003 | Dreher |
| 2003/0021005 A1 | 1/2003 | Liang et al. |
| 2003/0035199 A1 | 2/2003 | Liang et al. |
| 2003/0081172 A1 | 5/2003 | Dreher |
| 2003/0085906 A1 | 5/2003 | Elliott et al. |
| 2003/0143391 A1 | 7/2003 | Lai |
| 2003/0147046 A1 | 8/2003 | Shadduck |
| 2003/0152849 A1 | 8/2003 | Chan-Park et al. |
| 2003/0174385 A1 | 9/2003 | Liang et al. |
| 2003/0206260 A1 | 11/2003 | Kobayashi et al. |
| 2004/0008319 A1 | 1/2004 | Lai et al. |
| 2004/0027327 A1 | 2/2004 | LeCain et al. |
| 2004/0114111 A1 | 6/2004 | Watanabe |
| 2004/0120667 A1 | 6/2004 | Aylward et al. |
| 2004/0125247 A1 | 7/2004 | Seshan et al. |
| 2004/0125337 A1 | 7/2004 | Boulineau et al. |
| 2004/0165252 A1 | 8/2004 | Liang et al. |
| 2004/0169932 A1 | 9/2004 | Esch et al. |
| 2004/0190115 A1 | 9/2004 | Liang et al. |
| 2004/0233381 A1 | 11/2004 | Kim et al. |
| 2006/0006336 A1 | 1/2006 | Cano et al. |
| 2006/0087614 A1 | 4/2006 | Shadduck |
| 2006/0279848 A1 | 12/2006 | Kuiper et al. |
| 2007/0152560 A1 | 7/2007 | Naito et al. |
| 2008/0068723 A1 | 3/2008 | Jethmalani et al. |
| 2008/0212018 A1 | 9/2008 | Ballet et al. |
| 2008/0314499 A1 | 12/2008 | Begon et al. |

FOREIGN PATENT DOCUMENTS

| | | |
|---|---|---|
| CA | 2340672 | 12/2000 |
| DE | 197 14 434 | 10/1998 |
| EP | 728572 | 8/1996 |
| EP | 1225458 | 7/2002 |
| EP | 1308770 | 5/2003 |
| FR | 2561005 | 9/1985 |
| FR | 2718447 | 10/1995 |
| FR | 2872589 | 1/2006 |
| WO | 00/77570 | 12/2000 |
| WO | 02/01281 | 1/2002 |
| WO | WO 02/065215 | 8/2002 |
| WO | 03/012542 | 2/2003 |
| WO | 03/077012 | 9/2003 |
| WO | 03/102673 | 12/2003 |
| WO | 2004/015481 | 2/2004 |
| WO | 2004/034095 | 4/2004 |
| WO | WO 2004/051354 | 6/2004 |
| WO | 2005/033782 | 4/2005 |
| WO | WO 2006/013250 | 2/2006 |
| WO | WO 2006/050366 | 5/2006 |
| WO | 2006/067309 | 6/2006 |
| WO | 2007/010414 | 1/2007 |
| WO | 2007/023383 | 3/2007 |
| WO | 2007/144308 | 12/2007 |

OTHER PUBLICATIONS

Fowles, Grant R. Introduction to Modern Optics. New York: Dover Publications, 1989. Print. pp. 138-139.

Hecht, Eugene, "Optics, $4^{th}$ Edition" 2002 Addison Wesley, p. 428 (XP002465206) (chapter 10 from $2^{nd}$ edition provided).

Kaufman U.S. Appl. No. 60/507,940 Drawing Sheets 4, 5.

David R. Lide, ed., CRC Handbook of Chemistry and Physics, 89th edition (internet version 2009), CRC Press/Taylor and Francis, Boca Raton, FL., pp. 10-12 through 10-13.

Perez, Jose-Philippe, (Optique—Fondement et applications [Optics—Fundamentals and Applications], 7th edition, Paris 2004, p. 262) (English summary provided).

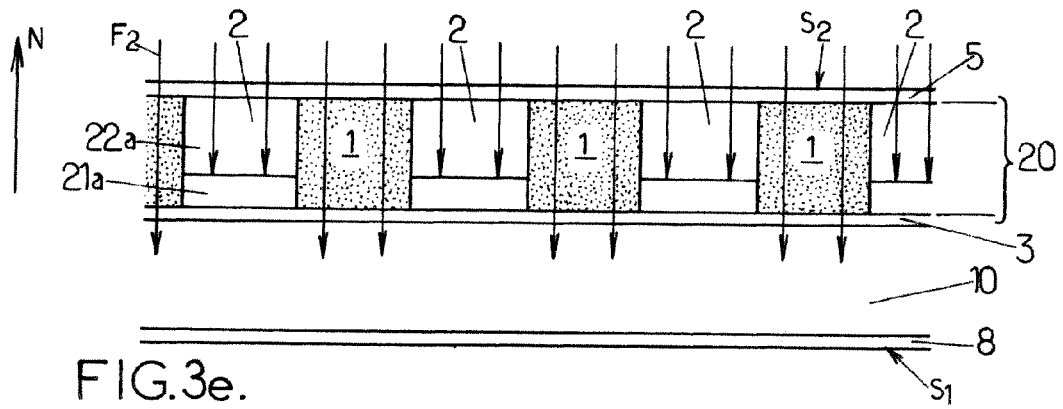
FIG. 3e.
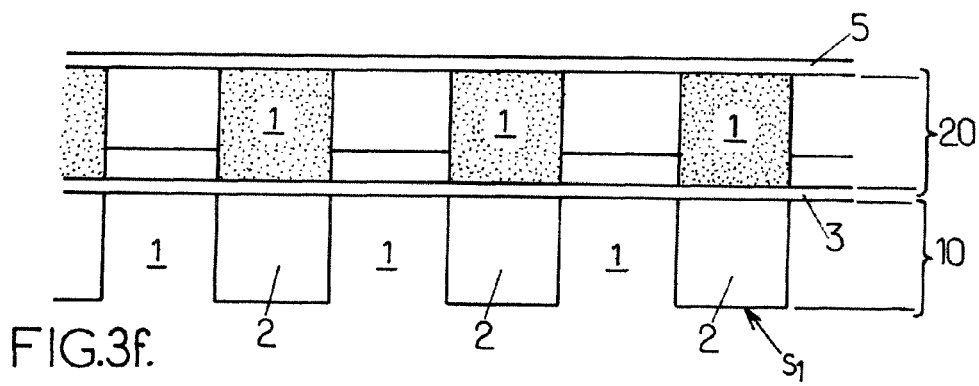
FIG. 3f.
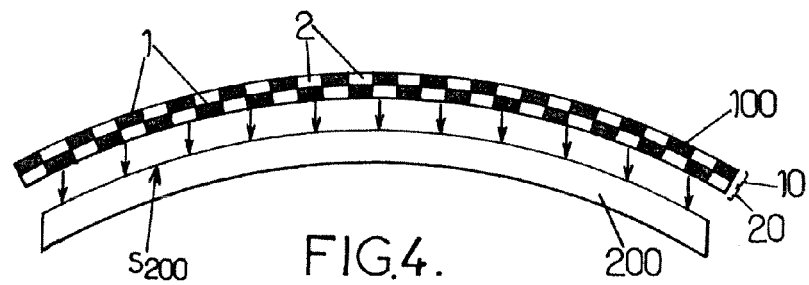
FIG. 4.
FIG. 5.
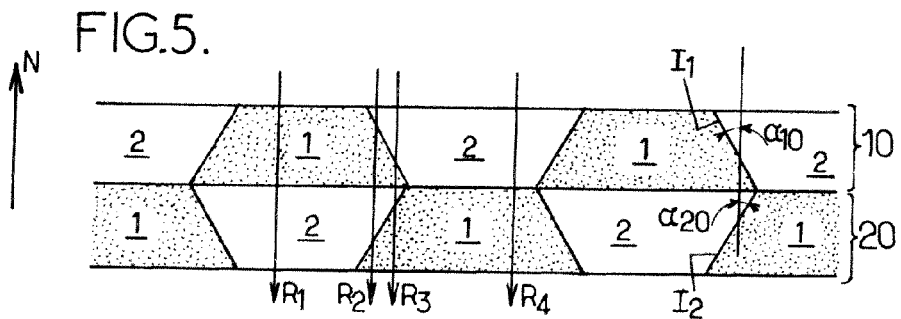

OPTICALLY TRANSPARENT COMPONENT WITH TWO SETS OF CELLS

CROSS-REFERENCE TO RELATED APPLICATIONS

This application is the National Stage of International Application No. PCT/EP2007/064336, filed on Dec. 20, 2007, which claims the priority of French Application No. 0611377, filed on Dec. 26, 2006. The contents of both applications are hereby incorporated by reference in their entirety.

The present invention relates to an optically transparent component having two sets of cells, to a layered structure suitable for use in fabricating such a component, and to methods of fabricating the component and the structure.

It is known, in particular from patent application WO 2006/013250, to make an optical component in the form of a base component that carries, on one of its surfaces, a set of juxtaposed cells. Such a component structure is often referred to as a pixelized structure. The cells contain one or more optically active materials, that confer some particular optical property on the component. Such a method of making optical components is particularly advantageous, because components can be obtained that have differing optical properties by varying the active material that is introduced into the cells.

It is also known to make an optical component that incorporates a plurality of sets of cells situated in respective superposed layers on a surface of a base optical component. The optical component then has a combination of optical properties that are conferred by all the sets of cells.

However such optical components exhibit transparency that can be insufficient for certain applications, in particular for ophthalmic applications. The separator walls between the cells in a set diffract light. This diffraction itself gives rise to macroscopic diffusion.

In the meaning of the invention, it is considered that an optical component is transparent when an image that is observed through the component is perceived without significant loss of contrast. In other words, interposing a transparent optical component between an image and an observer of the image does not significantly reduce the quality of the image. In particular, diffraction is defined as being the phenomenon whereby the light that is being observed is scattered when the light ray is physically limited (J-P. Perez, Optique, Fondements et applications [Optics, foundations and applications], 7th edition, DUNOD, October 2004, p. 262). Because of the diffraction by the walls of an optical component having cells, a point of light is no longer perceived as a point when looking through the optical component. The resulting macroscopic diffusion, or incoherent diffusion, produces a milky appearance or diffusion halo, due to the pixelized structure of the optical component. This leads to a loss of contrast in an image that is observed through the component. This loss of contrast is equivalent to a loss of transparency, as defined above.

An object of the present invention thus consists in proposing a novel type of optical component having cells, which component has an improved level of transparency.

For this purpose, the invention proposes a transparent optical component comprising a base optical component and two transparent sets of cells. The cells in the two sets are arranged in respective layers that are superposed on a surface of the base component. Each cell contains an optically active material, and the cells in each set are isolated from one another by separating portions within the corresponding layer, parallel to the surface of the base component. In addition, a cell in either set is located in line with a separating portion pertaining to the layer of the other set of cells, along an axis perpendicular to the surface of the base component. Furthermore, the respective outlines of a cell and of a separating portion located in line with each other have substantially identical projections on the surface of the base component.

In other words, in the invention, the two sets of cells have cell patterns that are complementary relative to the surface of the optical component. In addition, within each layer, the cells and the separating portions alternate in any direction parallel to the surface of the component, such that two adjacent cells are always disjoint.

In an optical component of the invention, a light ray that passes through the component substantially perpendicularly to the layers necessarily passes through one cell and one separating portion, regardless of the point of impact of the ray on the surface of the optical component. Depending on the point of impact, the only thing that varies is the order of the cell and the separating portion on the path of the ray. All of the rays of a given light beam thus have optical paths that are substantially equivalent through the optical component, so the component introduces little deformation in an image that is observed therethrough. In other words the component is more transparent in the meaning defined above.

Because of this equivalence between the paths of light rays passing through the optical component at different locations of the surface carrying the sets of cells, it is not necessary for the separating portions and the active materials that are contained in the cells to have identical refractive indices. Eliminating such an index-matching constraint makes it possible to use identical cell matrices for different optical components, that differ in the active materials that are introduced into the respective cells of the components. The base optical component and the sets of cells can then be produced in large quantities at low cost.

In addition, in an optical component of the invention, the separating portions between cells have dimensions parallel to the surface of the substrate that are comparable to the dimensions of the cells. They therefore do not give rise to diffraction at an additional scale. The transparency of the component is consequently also improved for this reason.

Furthermore, because the dimensions of the cells and the dimensions of the separating portions are comparable or identical, both sets of cells can be made easily, in particular by using known lithographic methods.

Finally, when the cells of at least one of the sets are closed by means of an external film that is applied on the set, the film can easily be fastened on the separating portions of the cells, e.g. by adhesive. Given that the separating portions present respective areas that are large and that are available for fastening the film, it is possible to obtain hermetic and robust sealing of the cells.

In particular, an optical component of the invention may form an optical lens, in particular an ophthalmic lens. It may also optionally form an element of an optical instrument for measuring or sighting, a lens for goggles, in particular for sporting or protective purposes, a helmet visor, a porthole window, etc.

The invention also provides a layered transparent cell structure that can be applied on a base optical component to obtain a pixelized component having two layers of cells as described above.

The invention also provides a method of fabricating such a structure, the method comprising the following steps:

a) obtaining a transparent structure of superposed layers comprising, in order: a first layer of lithographic resin, an additional layer that is absorbing for a radiation of a lithographic method suitable for etching the first layer of resin, and a second layer;

b) forming a mask on the second layer, this mask defining the locations of the cells to be formed;

c) selectively removing portions of the second layer and of the additional layer as defined by the mask so as to form a first set of cells in these layers;

d) filling the cells of the first set with at least one optically active material;

e) after the mask has been removed, irradiating the first layer of lithographic resin through the second layer and the additional layer so that the portions of said first layer that are located in line with cells of the first set become permanently fixed, selectively relative to portions of the first layer that are located in line with the remaining portions of the additional layer;

f) developing the first resin layer so as to form a second set of cells in the first resin layer; and g) filling the cells of the second set with an optically active material.

By using such a method, the two sets of cells are automatically obtained in a manner that is self-aligned and complementary relative to each other, and requiring only one mask to be used. No specific alignment step is therefore needed for obtaining the two superposed layers with the cells in one of the sets being located exactly in line with the separating portions between the cells of the other set. In addition, a cell and a separating portion that are located one over the other automatically have outlines that are identical, parallel to the layer structure.

Finally, the invention provides a method of fabricating an optical component in which a layered cell structure as described above is fitted on a base optical component. The resulting optical component may be an optical lens, and in particular an ophthalmic lens.

Other features and advantages of the present invention appear in the following description of non-limiting embodiments, given with reference to the accompanying drawings, in which:

FIGS. 3a-3f show successive steps in a method of fabricating a cell structure in accordance with the preceding figures;

FIG. 4 shows the fabrication of an optical component of the invention; and

FIG. 5 is a section view of a variant configuration of a cell structure of the invention.

Figure 1:
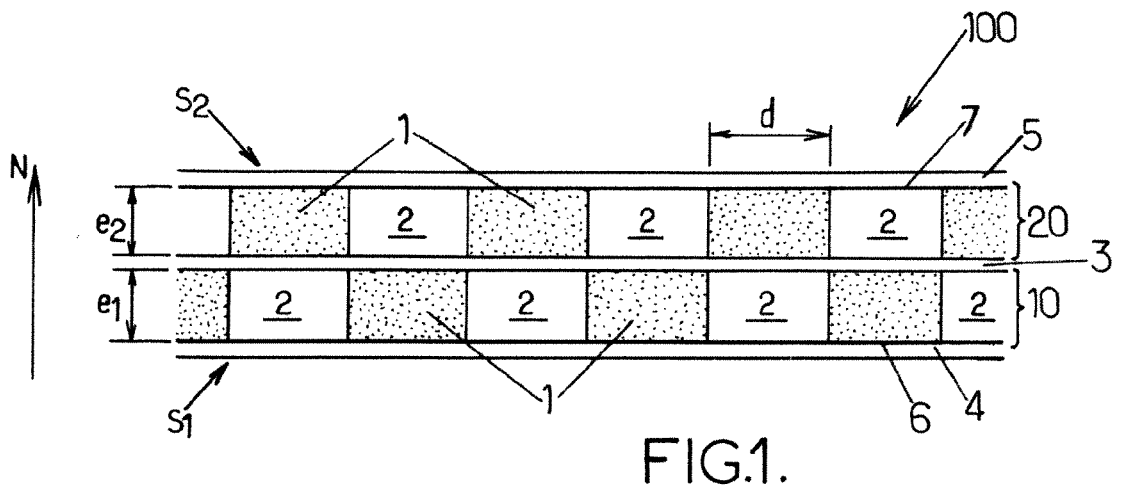
FIG. 1 is a section view of a cell structure of the invention.

For sake clarity in the figures, the dimensions of elements shown are not in proportion with the real dimensions or the real dimension ratios. Furthermore, when identical references are used on different figures they correspond to elements that are identical or that perform identical functions.

The description begins with a cell structure of the invention, given with reference to FIGS. 1 and 2a-2c.

The structure 100 comprises two sets of cells referenced 1, that are disposed in two layers 10 and 20 corresponding respectively to each of the sets of cells. The layers 10 and 20 are superposed within the structure 100 along an axis N perpendicular to the outside faces of the structure 100, which faces are referenced $S_1$ and $S_2$. The cells 1 in a given set, i.e. that are located in a given layer 10 or 20, are isolated from one another by separating portions referenced 2.

In addition, a cell 1 pertaining to the set of cells in the layer 10 is located in line with a separating portion 2 pertaining to the layer 20, along the axis N. Conversely, a cell 1 pertaining to the set of cells of the layer 20 is located in line with a separating portion 2 pertaining to the layer 10. Furthermore, a cell 1 and a portion 2 that are located in line with each other have respective outlines that have substantially identical projections on a surface parallel to the faces $S_1$ and $S_2$.

Figure 2A:
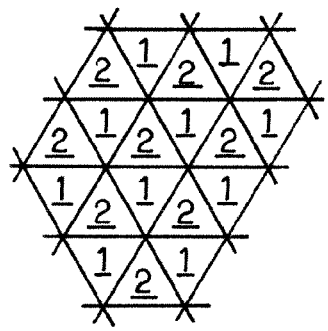
FIG. 2a-2c are plan views of cell structures in accordance with FIG. 1.
Figure 2B:
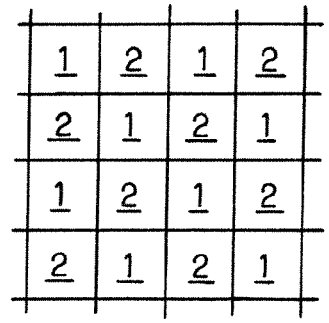
Figure 2C:
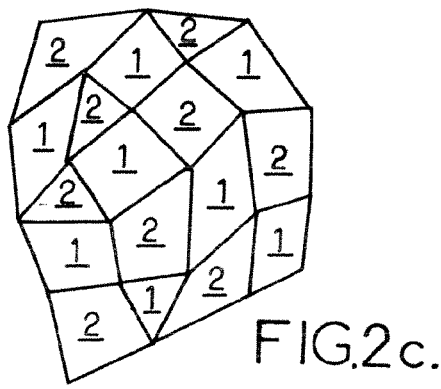

Because of the matching outlines of the cells in the two sets, the cells 1 of the layer 10 form a pattern that is complementary to the pattern of the cells 1 of the layer 20. The pattern of cells in each set may be triangular (FIG. 2a), square (FIG. 2b), rectangular, or even random (FIG. 2c). The lateral dimension of the cells 1 parallel to the structure 100, which is also the lateral dimensions of the portions 2, may lie in the range 1 micrometer (μm) to 200 μm, and preferably in the range 5 μm to 100 μm. Each cell 1 or portion 2 is then not individually visible to the naked eye and does not give rise to diffraction of light. This lateral dimension is referenced d in FIG. 1.

Both sets of cells, within the layers 10 and 20 respectively, preferably have filling factors that are substantially identical. The term "filling factor" when applied to a set of cells is used to mean the percentage of the area of the structure 100 that is occupied by the cells 1 in the set, within a given layer 10, 20. Given that the patterns in the two sets of cells are complementary, the two filling factors are then both substantially equal to 50%.

Each cell 1 contains an optically active material. The active material may comprise a refringent material, a polarizing material, an absorbing material, a colored material, a filter material, an electroactive material, etc. The material is selected in known manner as a function of the optical property that the cell structure 100 is to confer on an optical component with which it is integrated. For example, a refringent material may be introduced into the cells 11, which has an optical refractive index that varies between cells that are offset parallel to the structure 100. Thus, the structure 100 may exhibit a determined optical power expressed in diopters. Furthermore, in the meaning of the invention, an electroactive material is a material that has a characteristic that can vary in response to an electrical control signal.

The active material that is contained in at least one of the cells 1 may be a liquid or a gel. Under such circumstances, two external films referenced 4 and 5 can be disposed on either side of the structure 100 to close hermetically the cells 1 of the layers 10, 20. In this way, the active materials that are contained in the various cells 1 are prevented from mixing or leaking away from the structure 100. Each film 4, 5 may be bonded to the separating portions 2 of the corresponding layer 10, 20, for example by means of a layer of pressure-sensitive adhesive (PSA) material 6, 7. Optionally, a single external film may be placed on one side only of the structure 100, e.g. when the active materials that are contained in the cells 1 of one of the layers 10, 20 are cross-linked after being introduced into the cells.

The structure 100 may also include an intermediate film 3 disposed between the layers 10 and 20. Such a film 3 can confer improved cohesion to the structure 100, thus making the structure easier to manipulate.

The structure 100 is made of materials that are transparent so that it is itself transparent for light rays passing through it between its two outside faces. In particular, the separating portions 2 in at least one of the two layers 10, 20 may be made of resin, and the films 3-5 may be based on polycarbonate (PC), polyethylene (PE), polyimide, or polyethylene terephthalate (PET). The films 3-5 may have respective thicknesses on the axis N lying in the range 2 μm to 50 μm, and the layers 10, 20 may have respective thicknesses lying in the range 5 μm to 500 μm. In FIG. 1, the thicknesses of the layers 10 and 20 are referenced $e_1$ and $e_2$ respectively.

There follows a description of a method of obtaining such a layered cell structure, given with reference to FIGS. 3a-3f.

Figure 3A:
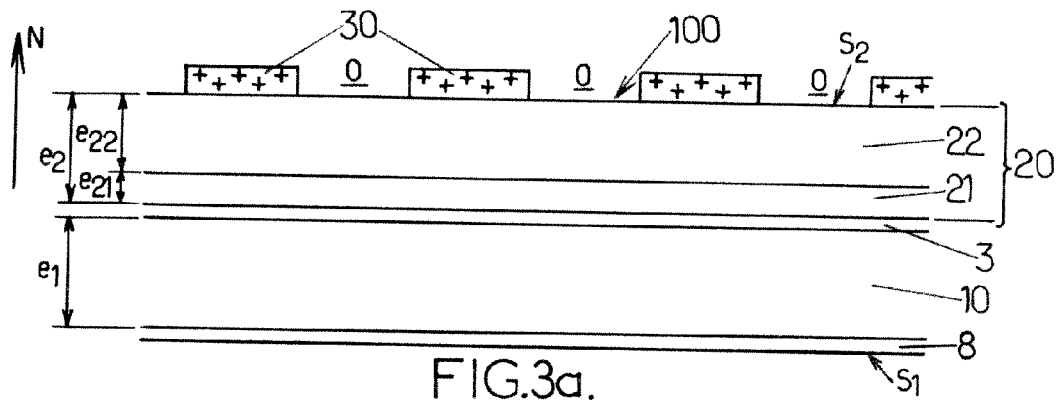
Figure 3B:
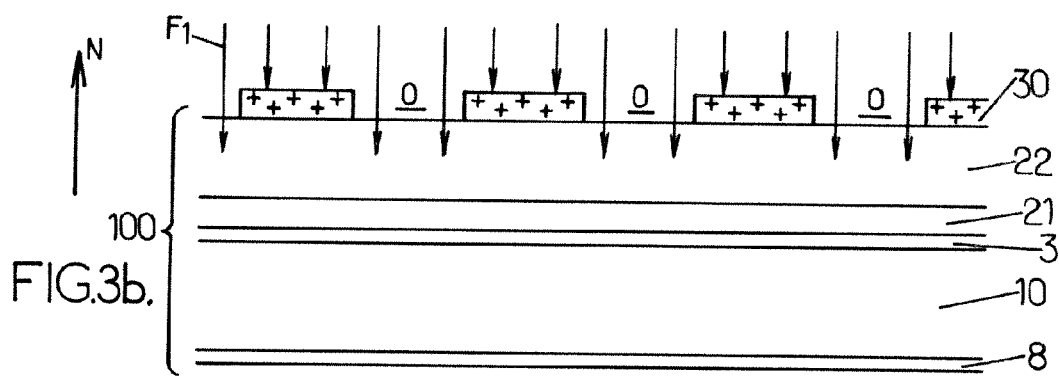

The structure 100 initially comprises, in order along the axis N going upwards in FIG. 3a: a layer of lithographic resin 10, an additional layer 21 of a resin that absorbs lithographic radiation usable for etching the layer 10, and another layer of resin 22. The layers 21 and 22 together form the layer 20 as described above. The layers 10, 21, and 22 are initially homogenous, and they present thicknesses that are uniform. For example, the thickness $e_{21}$ of the layer 21 lies in the range 10 μm to 200 μm and the thickness $e_{22}$ of the layer 22 lies in the range 10 μm to 400 μm. The structure 100 may optionally initially include the intermediate film 3 located between the layers 10 and 20, and/or a support film 8 that is disposed on a side of the layer 10 opposite from the layer 22. When the intermediate film 3 is present in the structure 100, it is transparent for the radiation used for lithographically etching the layer 10.

A mask 30 is then formed on the layer 22. In one possibility, the mask 30 may itself be formed by using a lithographic method. The mask 30 has openings referenced O, and the layers 22 and then 21 are etched by removing portions thereof through the openings O. In this manner, a first set of cells 1 is formed in the layers 21 and 22, which cells corresponding to the openings O in the mask 30.

The mask 30 presents a covering factor on the face S2 of the structure 100 that corresponds to the desired filling factor for the cells 1 in the layer 20. Preferably, the covering factor is approximately equal to 50% so as to end up with surface fractions occupied by the cells 1 that are shared in balanced manner between the layers 10 and 20.

In the same manner, the mask 30 presents a pattern of openings corresponding to the cell pattern desired for the layer 20. In particular, the openings O may thus exhibit a pattern that is triangular, square, rectangular, or random.

Two different methods may be used for etching the layers 21 and 22.

In a first method, at least the layer 22 is made of lithographic resin and is etched using an appropriate lithographic method. For this reason, radiation F1 (FIG. 3b), which may be ultraviolet radiation or an electron beam, is directed against the layer 22 through the openings O in the mask 30, in the reverse direction along the axis N. The remaining portions of the mask 30 absorb the radiation F1 so that only the uncovered portions of the layer 22 are irradiated. Irradiation causes the resin of the layer 22 to be polymerized or cross-linked in those portions thereof that are uncovered, such that those portions become permanently fixed.

The remaining portions of the mask 30 are removed.

Figure 3C:
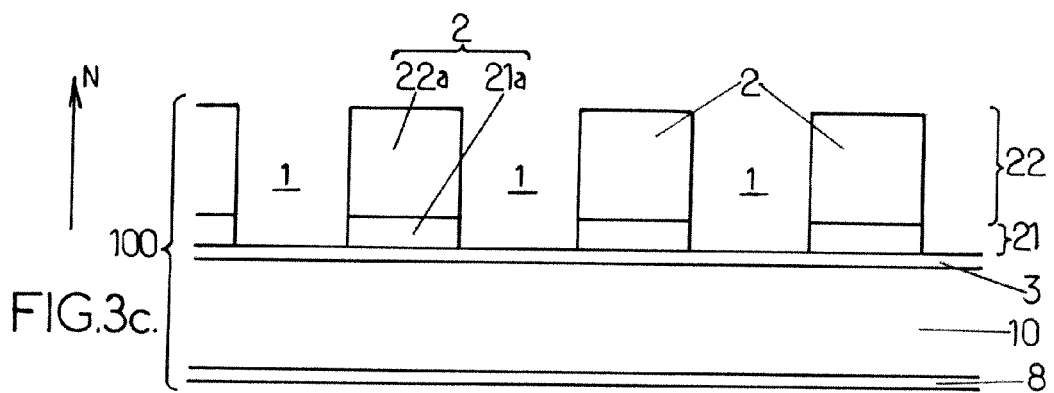

The layer 22 is then developed: its portions that have not been irradiated are eliminated (FIG. 3c). In other words, the layer 22 is a resin negative.

Developing the lithographic resin of the layer 22 is itself known, and can be performed by putting the layer 22 into contact with a bath for dissolving the non-polymerized resin. The portions of the layer 21 that are located in line with the portions that have been eliminated from the layer 22 can be removed simultaneously, e.g. because the same lithographic resin as that used in the layer 22 is a component of material in the layer 21. Alternatively, the layer 21 may merely be soluble on coming into contact with a suitable solution at the locations of the portions of the layer 22 that have been removed.

In a second method that is not shown in the figures, the uncovered portions of the layer 22 can be removed by being etched using an ion beam. This technique of reactive ion etching (RIE) is also known to the person skilled in the art. For this purpose, the surface $S_2$ of the structure 100 is scanned with a beam of ions having energy that is sufficiently high to pulverize the resin in the open zones of the mask 30. The layer 21 may optionally be etched simultaneously by the ion beam.

The remaining portions of the layer 22, referenced 22a in FIG. 3c, and those of the layer 21, referenced 21a, form the separating portions 2 of the layer 20, and the empty portions of the layers 21 and 22 constitute the cells 1.

Figure 3D:
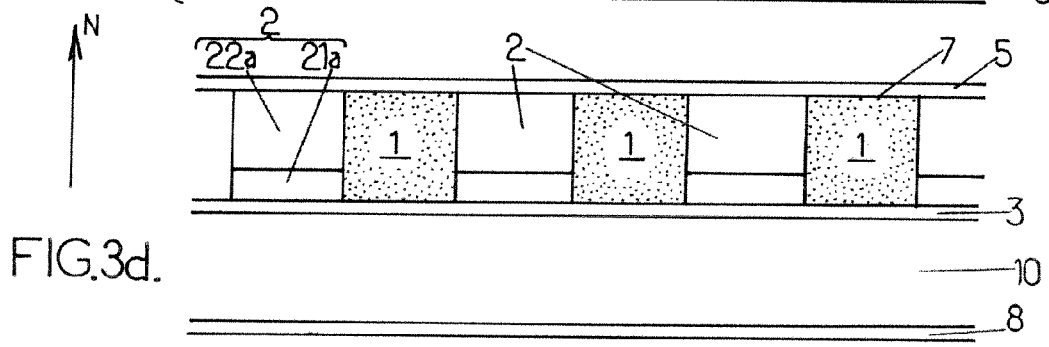

One or more optically active materials is/then are introduced into the cells 1 of the layer 2 so as to fill them (FIG. 3d). When the active materials are liquids or gels, they can be introduced into the cells 1 by using a spray head, e.g. of the ink jet printer type. The head is moved over the surface $S_2$ and is activated when it is facing a cell so as to spray the active materials therein. Filing the cells in this way is particularly rapid and inexpensive, in particular because it can be programmed and it is compatible with using a plurality of active materials for a given cell structure. In addition, a plurality of active materials can be mixed within a given cell, by introducing appropriate quantities of each material into the cell, using different nozzles of the head, which nozzles are connected to reservoirs of respective active materials.

Optionally, the cells 1 filled with active material in the layer 20 can be sealed by means of a film 5 that is fastened on the free surfaces of the separator portions 2. For example, the film 5 may be covered by a layer 7 of PSA material and pressed against the faces $S_2$ of the structure 100, with the layer 7 facing the layer 20. As an alternative, other adhesive materials can be used for the layer 7.

The layer of lithographic resin 10 is then irradiated via the face $S_2$, through the layer of cells 20 (FIG. 3e), so that the portions of the layer 10 that are located in line with the cells 1 of the layer 20 become permanently fixed, selectively compared with the portions of the layer 10 that are located in line with the remaining portions 21a and 22a of the layers 1 and 22. For this purpose, radiation $F_2$, which may be ultraviolet radiation or an electron beam, is directed against the surface $S_2$ of the structure parallel to the axis N and in the opposite direction thereto. The remaining portions 21a of the layer 21 perform the mask function by absorbing the radiation $F_2$, so that only those portions of the layer 10 that are located in line with the cells 1 of the layer 20 are irradiated. For this purpose, the films 3 and 5 are transparent for the radiation $F_2$.

When the structure 100 includes a support film 8 on its face $S_1$, it is removed, e.g. by being peeled off (FIG. 3f).

The layer 10 is of negative lithographic resin, possibly identical to that of the layer 22. On being developed, only those portions thereof that have not been irradiated are eliminated. In this way, the separating portions 2 are also created in the layer 10, in line with the cells 1 in the layer 20. These portions 2 of the layer 10 define cells 1 in said layer 10, of outline that coincides with the outline of the portions 2 and of the cells 1 in the layer 20. Thus, the two layers 10 and 20 contain respective sets of cells 1 that are disposed in complementary manner.

Finally, the cells 1 of the layer 10 are filled with optically active material(s) using a method analogous to that already used for the cells 1 of the layer 20. Optionally, the filled cells of the layer 10 are subsequently sealed by applying a second outer film on the face $S_1$ of the structure 100. Advantageously, the structure 100 is turned over during these last two steps so that the cells 1 of the layer 10 are open upwardly. The structure 100 then has the configuration shown in FIG. 1.

A cell structure 100 as proposed by the present invention can then be used for fabricating an optical component, in particular an ophthalmic lens. To this end, a base optical component 200 (FIG. 4), is initially obtained in order to act as a substrate. The base component 200 may itself be an optical lens, or an ophthalmic lens. The term "ophthalmic lens" is used to mean a lens that is designed to be fitted to a frame for a pair of eyeglasses. The lens may be obtained prior to being cut to the dimensions of a housing in the frame. That constitutes an ophthalmic lens blank. Alternatively, it may already be cut to the dimensions of the frame. The structure 100 is then fitted onto one of the faces $S_{200}$ of the base component 200, while being provided with a curvature identical to that of the face $S_{200}$. For this purpose, the structure 100 is deformed with care, using a method that is itself known, so as to avoid crushing or damaging the cells 1 or the separating portions 2 in either of the layers 10 and 20. The structure 100 is then fastened on the face $S_{200}$ of the base component 200, e.g. by adhesive.

The optical component with cells that is obtained in this way generates reduced diffraction of a light beam passing through it. In other words, the initial intensity of the beam, i.e. its intensity prior to passing through the component, is to be found almost entirely in the zero order of diffraction after passing through the component. In particular, optical components of the invention have been made in which a fraction of the energy of the incident light beam in excess of 95% is contained in the zero order diffraction, for a direction of incidence that is perpendicular to the surface of the component. In addition, this fraction remains substantially constant when the two layers 10 and 20 are of identical thicknesses that vary simultaneously.

Such a component also exhibits chromatic effects that are very small. In particular, practically no iridescence is visible on the component, even when observed at varying angles of incidence. The component is thus particularly suitable for numerous applications, and in particular those that have particularly severe requirements in terms of appearance, such as ophthalmic applications.

Naturally, numerous adaptations of the invention can be introduced compared with the embodiment described above. In particular, the structure 100 may also include functional coatings on at least one of its faces $S_1$ or $S_2$, and in particular on that one of its faces that remains exposed in the final optical component. Such functional coatings can be carried by the outer film 4 or 5. These may comprise, in particular, an anti-impact coating, an anti-reflection coating, an anti-scratch coating, a dirt-repellent coating, or a combination of some of said coatings.

In addition, the etched resin layer 22 initially may alternatively be made of a positive resin. Under such circumstances, the cells 1 of the layer 20 are formed at the locations of the openings O in the mask 30.

In a variant embodiment of the invention, shown in FIG. 5, a first cell 1 and a first separating portion 2 that are adjacent to each other within one of the layers 10, 20 may present an interface $I_1$ that is oblique relative to the axis N. A second cell and a second separating portion that are also adjacent to each other and that both belong to the other layer, being located in line with the first separating portion and the first cell respectively, then have an interface $I_2$ that is inclined in the opposite direction relative to the interface $I_1$. In other words, at the two interfaces the angles $\alpha_{10}$ and $\alpha_{20}$ relative to the axis N have equal absolute values and opposite orientations. Such a cell structure also leads to reduced diffraction, since the light rays passing through the structure parallel to the axis N have identical path lengths through the active material and the material constituting a separating portion, regardless of the offset of the rays relative to the interfaces $I_1$ and $I_2$ (see the rays $R_1$-$R_4$ in FIG. 5).

Finally, the layered structure may be flexible or rigid, planar or curved, and may optionally be used on its own as a separate optical component.

The invention claimed is:

1. A transparent optical component comprising a base optical component and two transparent sets of cells arranged in respective layers superposed on a surface of said base component, each cell containing an optically active material, and the cells in each set being isolated from one another by separating portions within the corresponding layer, parallel to the surface of the base component, the component being characterized in that a cell in each set is located in line with a separating portion pertaining to the other set of cells, along an axis perpendicular to the surface of the base component, with respective outlines for said cell and said separating portion that have substantially identical projections on the surface of the base component.

2. The component according to claim 1, in which the sets of cells have filling factors that are substantially identical within the respective layers.

3. The component according to claim 1, in which the sets of cells have respective patterns that are triangular, square, rectangular, or random within the respective layers.

4. The component according to claim 1, in which the separating portions are of resin in at least one of the layers.

5. The component according to claim 1, further comprising an intermediate film disposed between the respective layers of the two sets of cells.

6. The component according to claim 1, further comprising at least one external film disposed on a side of one of the layers of set of cells that is opposite from the side on which the other layer of set of cells is disposed.

7. The component according to claim 1, in which the optically active material contained in at least one of the cells comprises a refringent material, a polarizing material, an absorbing material, a colored material, a filter material, or an electroactive material.

8. The component according to claim 1, in which the optically active material contained in at least one of the cells is a liquid or a gel.

9. The component according to claim 1, in which a first cell and a first separating portion that are adjacent within one of the layers have a first interface that is oblique relative to a direction perpendicular to the surface of the optical component, and in which a second cell and a second separating portion adjacent to each other and forming part of the other layer, and being located in line with said first separating portion and first cell, respectively, have a second interface that is inclined oppositely relative to said first interface.

10. The component according to claim 1, that forms an optical lens.

11. The component according to claim 10, in which the base optical component itself comprises an optical lens.

12. The component according to claim 10, forming an ophthalmic lens.

13. A layered transparent cellular structure comprising two sets of cells arranged in respective superposed layers in said structure, each cell containing an optically active material, and the cells of each set being isolated from one another by separating portions within the corresponding layer in directions that are parallel to the layer structure, the structure being characterized in that a cell of each set is located in line with a separating portion pertaining to the layer of the other set of cells, along an axis perpendicular to the cell structure, with respective outlines for said cell and said separating portion that have substantially identical projections on a surface parallel to the layered structure.

14. The structure according to claim 13, in which the sets of cells have substantially identical filling factors within the respective layers.

15. The structure according to claim 13, in which the sets of cells have respective patterns that are triangular, square, rectangular, or random within the respective layers.

16. The structure according to claim 13, in which the separating portions are made of resin in at one of the layers of the structure.

17. The structure according to claim 13, further comprising an intermediate film disposed between the respective layers of the two sets of cells.

18. The structure according to claim 13, further comprising at least one external film disposed on a side of one of the layers of set of cells that is opposite from the side on which the other layer of set of cells is disposed.

19. The structure according to claim 13, in which the optically active material contained in at least one of the cells comprises a refringent material, a polarizing material, an absorbing material, a colored material, a filter material, or an electroactive material.

20. The structure according to claim 13, in which the optically active material contained in at least one of the cells is a liquid or a gel.

21. The structure according to claim 13, in which a first cell and a first separating portion that are adjacent within one of the layers have a first interface that is oblique relative to an axis perpendicular to the structure, and in which a second cell and a second separator portion that are adjacent to each other and form part of the other layer, and being located in line with said first separating portion and said first cell, respectively, have a second interface that is inclined oppositely relative to said first interface.

22. A method of fabricating a transparent optical component, the method comprising the following steps:
obtaining a base optical component;
obtaining a layered transparent cellular structure according to claim 13; and
fastening the layered structure on a surface of the base optical component.

23. The method according to claim 22, in which said optical component forms an optical lens.

24. The method according to claim 23, in which the base optical component itself comprises an optical lens.

25. The method according to claim 23, in which said optical component forms an ophthalmic lens.

26. A method of fabricating a layered transparent cell structure, the method comprising the following steps:
a) obtaining a transparent structure of superposed layers comprising, in order: a first layer of lithographic resin, an additional layer that is absorbing for a radiation of a lithographic method suitable for etching the first layer of resin, and a second layer;
b) forming a mask on said second layer, said mask defining the locations of cells to be formed;
c) selectively removing portions of said second layer and of the additional layer as defined by the mask so as to form a first set of cells in said second layer and in said additional layer;
d) filling the cells of the first set with at least one optically active material;
e) after the mask has been removed, irradiating the first layer of lithographic resin through the second layer and the additional layer so that portions of said first layer that are located in line with cells of the first set become permanently fixed, selectively relative to portions of said first layer that are located in line with remaining portions of the additional layer;
f) developing the first resin layer so as to form a second set of cells in said first resin layer; and
g) filling the cells of the second set with optically active material.

27. The method according to claim 26, in which the second layer is made of lithographic resin, and in which step c) is performed using a lithographic method.

28. The method according to claim 26, in which step c) is performed by etching the second layer with an ion beam.

29. The method according to claim 26, in which the mask has a covering factor with the second layer that is approximately equal to 50%.

30. The method according to claim 26, in which the mask has a pattern that is triangular, square, rectangular, or random.

31. The method according to claim 26, in which the layered structure further includes an intermediate film situated between said first layer and said additional layer.

32. The method according to claim 26, in which the layered structure initially further comprises a support film disposed on a side of the first resin layer opposite from its side on which the second layer is disposed, and in which the method further includes a step of removing said support film, which step of removing is performed before step f).

33. The method according to claim 26, further including at least one step of closing the cells of one of the first and second sets of cells by means of an external film fastened on said set of cells.

34. The method according to claim 26, in which the optically active material used in steps d) and g) comprises a refringent material, a polarizing material, an absorbing material, a colored material, a filter material, or an electroactive material.

35. The method according to claim 26, in which the optically active material used in steps d) and g) is a liquid or a gel.

* * * * *